US009607402B1

(12) United States Patent
Whiting et al.

(10) Patent No.: US 9,607,402 B1
(45) Date of Patent: Mar. 28, 2017

(54) CALIBRATION OF PEDESTRIAN SPEED WITH DETECTION ZONE FOR TRAFFIC INTERSECTION CONTROL

(71) Applicant: ITERIS, INC., Santa Ana, CA (US)

(72) Inventors: Michael T. Whiting, Rancho Santa Margarita, CA (US); Yan Gao, Placentia, CA (US); Dilip Swaminathan, Costa Mesa, CA (US); Shashank Jayaram Shivakumar, Santa Ana, CA (US); Robert J. Hwang, Brea, CA (US); Todd W. Kreter, Irvine, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 15/150,280

(22) Filed: May 9, 2016

(51) Int. Cl.
| G06K 9/00 | (2006.01) |
| G06T 7/20 | (2006.01) |
| G08G 1/005 | (2006.01) |
| G06T 7/00 | (2006.01) |
| G06F 19/00 | (2011.01) |

(52) U.S. Cl.
CPC .......... *G06T 7/2033* (2013.01); *G06T 7/0042* (2013.01); *G08G 1/005* (2013.01); *G06T 2207/20081* (2013.01); *G06T 2207/20104* (2013.01); *G06T 2207/30196* (2013.01); *G06T 2207/30236* (2013.01); *G06T 2207/30241* (2013.01); *G06T 2207/30242* (2013.01)

(58) Field of Classification Search
USPC ....... 382/100, 103–107, 151, 155, 162, 168, 382/172–173, 181, 199, 203, 209, 219, 382/224, 232, 254, 274, 276, 286–291, 382/305, 312; 340/922, 902; 701/93, 118
See application file for complete search history.

(56) References Cited

U.S. PATENT DOCUMENTS

| 9,272,709 | B2 * | 3/2016 | Ben Shalom | ......... B60W 30/00 |
| 2013/0293394 | A1 * | 11/2013 | Rubin | ...................... G08G 9/02 340/902 |
| 2014/0188365 | A1 * | 7/2014 | Nagata | ...................... B60T 7/22 701/93 |
| 2015/0046058 | A1 * | 2/2015 | Nagata | ...................... B60T 7/22 701/93 |
| 2015/0210277 | A1 * | 7/2015 | Ben Shalom | ......... B60W 30/00 382/104 |
| 2016/0027300 | A1 * | 1/2016 | Raamot | .................... G08G 1/08 340/922 |

* cited by examiner

*Primary Examiner* — Seyed Azarian
(74) *Attorney, Agent, or Firm* — Lazaris IP

(57) ABSTRACT

Pedestrian detection and counting for traffic intersection control analyzes characteristics of a field of view of a traffic detection zone to determine a location and size of a pedestrian area, and applies protocols for evaluating pixel content in the field of view to identify individual pedestrians. The location and size of a pedestrian area is determined based either on locations of vehicle and bicycle detection areas or on movement of various objects within the field of view. Automatic pedestrian speed calibration with a region of interest for pedestrian detection is accomplished using lane and other intersection markings in the field of view. Detection and counting further includes identifying a presence, volume, velocity and trajectory of pedestrians in the pedestrian area of the traffic detection zone.

24 Claims, 7 Drawing Sheets

CALIBRATION OF PEDESTRIAN SPEED WITH DETECTION ZONE FOR TRAFFIC INTERSECTION CONTROL

FIELD OF THE INVENTION

The present invention relates to the field of traffic detection. Specifically, the present invention relates to calibrating a pedestrian speed in a region of interest of a traffic detection zone used by pedestrians, for pedestrian detection and counting in traffic intersection control.

BACKGROUND OF THE INVENTION

There are many conventional traffic detection systems for intersection control. Conventional systems typically utilize sensors, either in the roadway itself, or positioned at a roadside location or on traffic lights proximate to the roadway. Common types of vehicular sensors are inductive coils, or loops, embedded in a road surface, and video cameras, radar sensors, acoustic sensors, and magnetometers, either in the road itself, or at either the side of a roadway or positioned higher above traffic to observe and detect vehicles in a desired area. Each type of sensor provides information used to determine a presence of vehicles in specific traffic lanes, to provide information for proper actuation of traffic signals.

These conventional detection systems are commonly set up with 'virtual zones', which are hand- or machine-drawn areas on an image where objects may be moving or present. Traditionally, a vehicle passes through or stops in a zone, and these zones generate an "output" when an object is detected as passing through or resting within all or part of the zone. Many detection systems are capable of detecting different types of vehicles, such as cars, trucks, bicycles, motorcycles, pedestrians, etc. This is accomplished by creating special zones within a field of view to differentiate objects, such as bicycle zones and pedestrian zones. Therefore, conventional detection systems are capable of differentiating, for example, bicycles from other types of vehicles by analyzing these special zones.

Outputs are sent to external devices or locations for use or storage, such as for example to a traffic signal controller, which performs control and timing functions based on the information provided. These outputs also provide traffic planners and engineers with information on the volume of traffic at key points in a traffic network. This information is important for comparing volumes over periods of time to help with accurate adjustment of signal timing and managing traffic flow. Current systems and methods of traffic detection provide data that results only from a count of a total number of vehicles, which may or may not include bicycles or other road users, as therefore there is no way differentiating between different types of vehicles. As the need for modified signal timing to accommodate bicyclists, pedestrians and others becomes more critical for proper traffic management, a method for separating the count of all modes of use on a thoroughfare is needed to improve the ability to accurately manage traffic environments.

Traffic planners and engineers require data on the volume of pedestrian traffic at key points in a traffic network. This data is important for comparing volumes over periods of time to help with accurate adjustment of signal timing. No current method for automatic count and data collection for pedestrian activity exists in a traffic detection system. As the need for modified signal timing to accommodate roadway users such as pedestrians becomes more critical for proper traffic management, a method for accurately identifying and counting pedestrians using a roadway intersection would greatly improve the ability to efficiently manage traffic environments.

BRIEF SUMMARY OF THE INVENTION

It is therefore one objective of the present invention to provide a system and method of determining a pedestrian area within a traffic detection zone for traffic intersection control. It is another objective of the present invention to provide a system and method of determining a pedestrian area within a traffic detection zone based on the location of one or both of a vehicle detection zone(s) and a bicycle detection zone(s). It is still another objective to provide a system and method of determining a pedestrian area within a traffic detection zone based on movement of various objects in a field of view of the traffic detection zone, such as pedestrians, vehicles, and bicycles.

It is a further objective of the present invention to provide a system and method of accurately counting pedestrians within a traffic detection zone for traffic intersection control. It is yet another objective of the present invention to provide a system and method of identifying characteristics of a pedestrian to improve count accuracy. Another objective of the present invention is to incorporate part-based object recognition to identify characteristics of a pedestrian within a field of a view of a traffic detection zone.

Yet another objective of the present invention is to automatically calibrate a traffic detection system by calculating pedestrian speed in a field of view for improved traffic intersection control. A further objective is to provide a system and method of identifying pedestrian incidents in a traffic detection zone, and triggering an alarm based on pedestrian incidents. It is still a further objective of the present invention to combine vehicle detection, bicycle detection, and pedestrian detection in a whole scene analysis of a field of view for traffic intersection control.

The present invention provides systems and methods of identifying a presence, volume, velocity and trajectory of pedestrians in a region of interest in a field of view of a traffic detection zone. These systems and methods present an approach to traffic intersection control that includes, in aspect embodiment, both identification of a pedestrian detection zone in the field of view, and identification of individual pedestrians in the pedestrian detection zone. This approach, styled as a pedestrian zone detection, identification and counting framework, enable improved pedestrian counting in the pedestrian detection zone, and increased accuracy in various aspects of roadway management.

Identification of a pedestrian detection zone in the field of view in the present invention is performed, in one embodiment, using a zone position analysis that automatically determines a pedestrian area in an intersection based on locations of one or both of vehicle and bicycle detection zones. Such vehicular and bicycle detection zones are either themselves automatically determined in a field of view, or drawn by a user. Regardless, knowledge of the location of these zones allows the present invention to calculate a pedestrian detection zone based on their position relative to a stop bar at a traffic intersection.

Identification of a pedestrian detection zone in the field of view in the present invention is performed, in another embodiment, using an object movement analysis automatically determines a pedestrian area in an intersection based on movement of various other objects within the field of view irrespective of the location of other detection zones.

These objects include vehicles, motorcycles, bicycles, pedestrians, and any other moving objects that may be detected by sensors capturing data in the field of view. Regardless, analysis of image pixel activity of these moving objects allows the present invention to calculate a pedestrian detection zone.

Identification of individual pedestrians in the pedestrian detection zone in the present is performed, in one embodiment, by comparing a part-based object recognition analysis with a model of a single walking pedestrian to differentiate individual pedestrians from groups of moving pedestrians. Such a comparison analyzes image characteristics to separate groups of pedestrians for improved count accuracy.

The present invention also includes calibration of pedestrian speed in traffic intersection control. In this embodiment, the pedestrian zone detection, identification and counting framework locates a region of interest based on locations of intersection or pavement markings and lane structures, such as a stop bar and lane lines, and computes features of an image inside the region of interest to calculate the pedestrian speed.

The present invention also includes incident detection in traffic intersection control. In this embodiment, the pedestrian zone detection, identification and counting framework learns a background of the pedestrian detection zone, and looks for changes in the background to identify non-moving objects such as prone objects or pedestrians or unauthorized vehicles. Identification of such non-moving objects initiate an alarm for responsible authorities to improve emergency response and efficient intersection performance.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
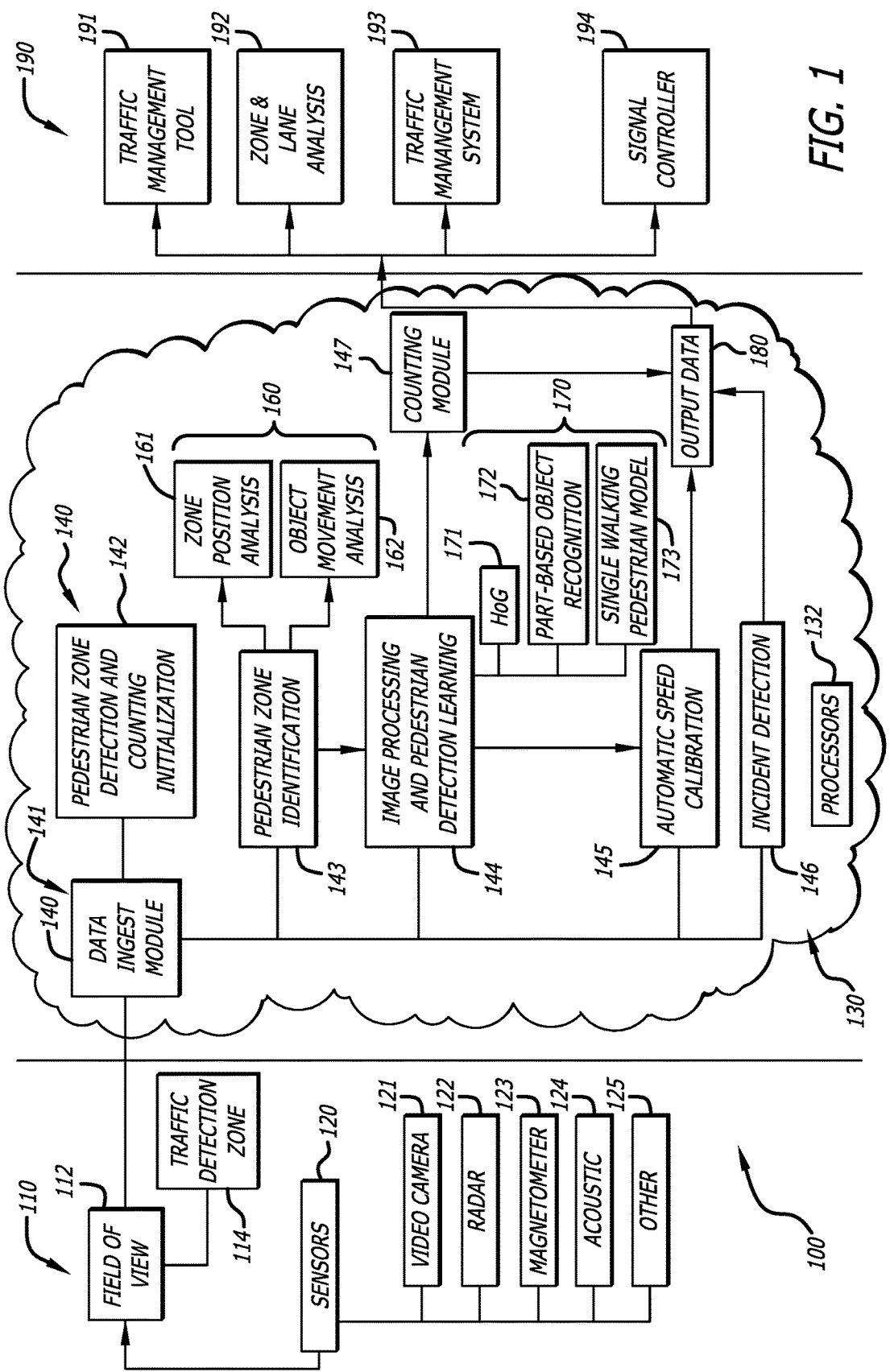
FIG. 1 is a system diagram for a pedestrian zone detection, identification and counting according to one aspect of the present invention.

FIG. 1 is a system diagram illustrating elements of a pedestrian tracking and counting framework 100, according to one aspect of the present invention. The pedestrian tracking and counting framework 100 is performed within one or more systems and/or methods that includes several components, each of which define distinct activities for defining an area used by pedestrians 102 in a traffic detection zone 114, and accurately counting pedestrians 102 in such an area, for traffic intersection control.

Figure 5:
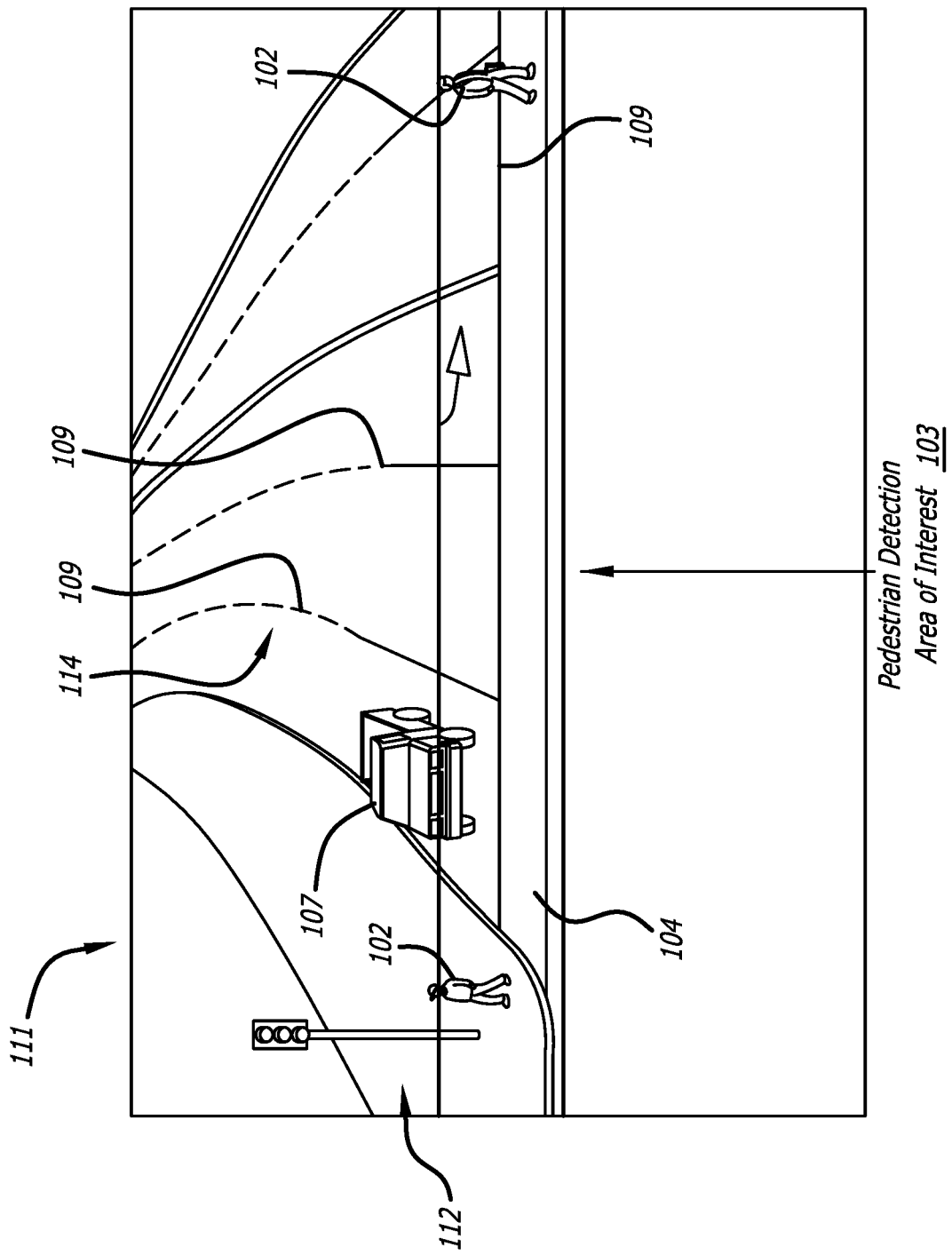
FIG. 5 is an exemplary representation of a field of view in a traffic detection zone, showing in a particular a region of interest for pedestrian detection according to the present invention.
Figure 6:
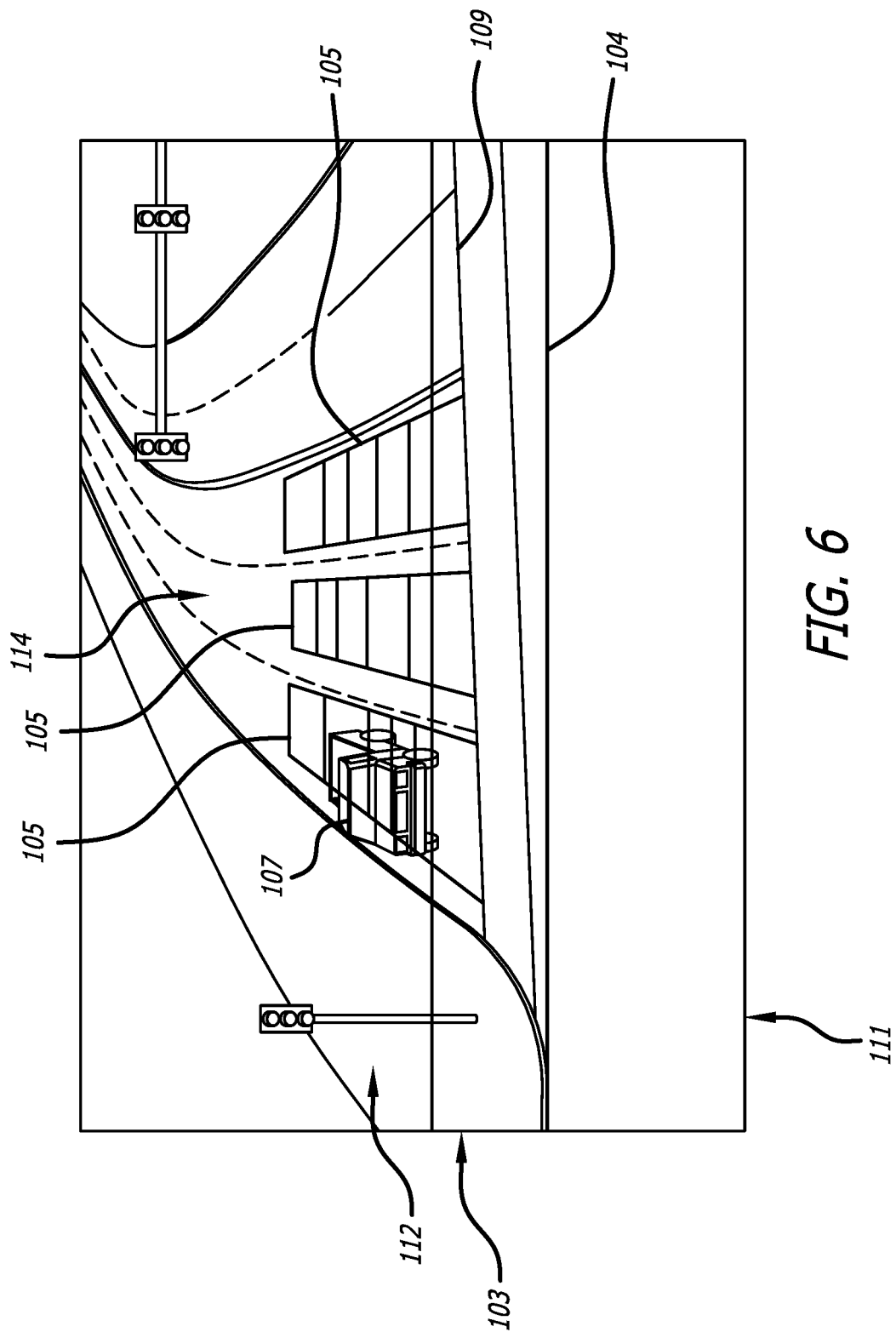
FIG. 6 is another exemplary representation of a field of view in a traffic detection zone, showing vehicular, bicycle, and pedestrian detection zones according to one embodiment of the present invention.
Figure 7:
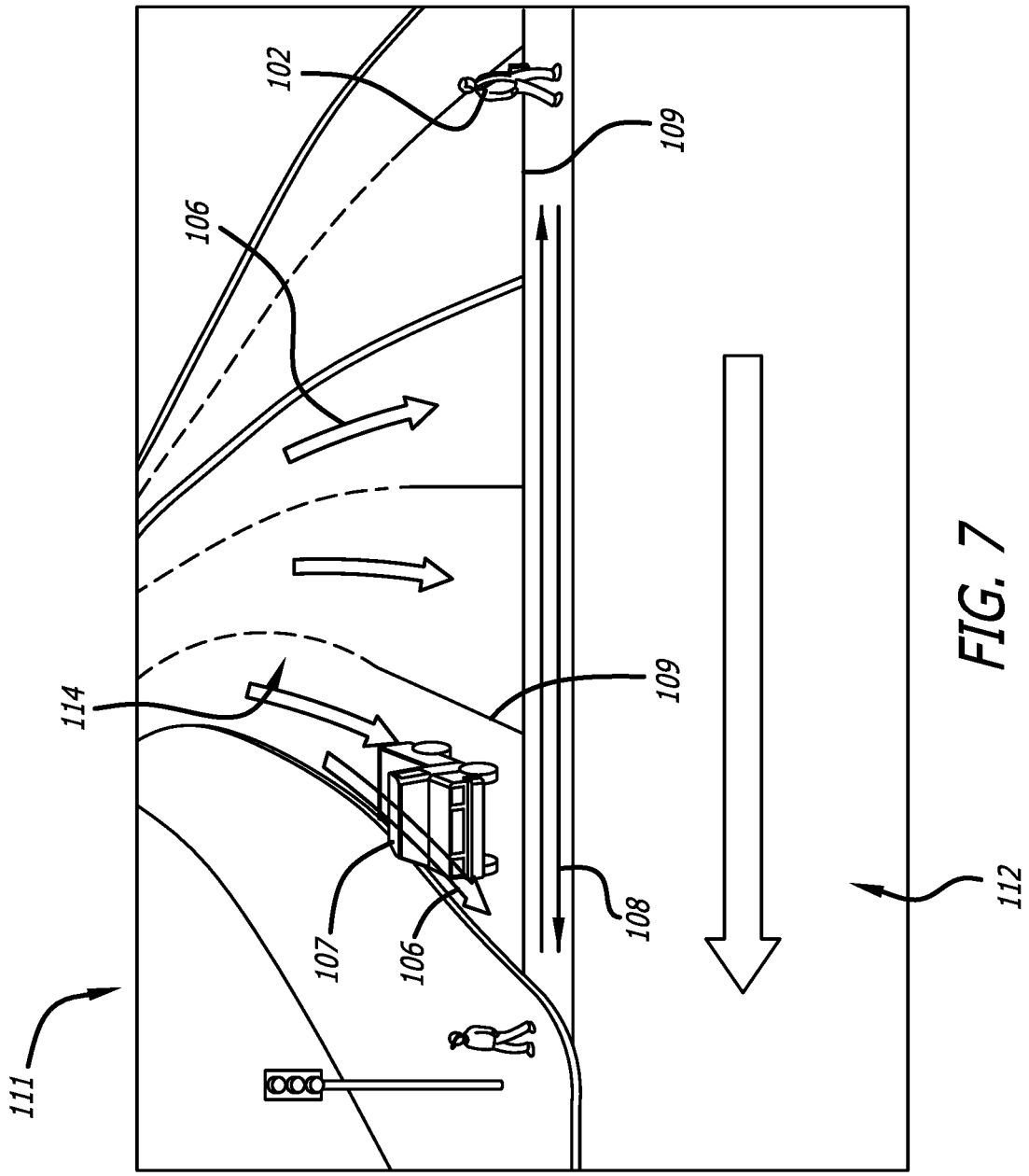
FIG. 7 is further exemplary representation of a field of view in a traffic detection zone, showing accumulated tracks of vehicles and pedestrians according to one embodiment of the present invention.

FIG. 5-7 are exemplary screenshot images 111 of a field of view 112 in a traffic detection 114. In the exemplary image 111 of FIG. 5, a region of interest 103 is highlighted for a pedestrian detection zone 104, and a pedestrians 102 are shown present therein. In the exemplary image 111 of FIG. 6, the pedestrian detection zone 104 is shown below user-drawn vehicular and bicycle detection zones 105 in the field of view 112. In the exemplary image of FIG. 7, arrows indicate accumulated tracks 106 of moving objects 107 are shown therein, as are pedestrian tracks 108 in the region of interest 103. Each of FIG. 5-7 also show standard intersection roadway markings and lane structures 109.

Returning to FIG. 1, the pedestrian tracking and counting framework 100 ingests, receives, requests, or otherwise obtains input data 110 that represents a field of view 112 of the traffic detection zone 114. Input data 110 is collected from the one or more sensors 120, which may be positioned in or near a roadway area for which the traffic detection zone 114 is identified and drawn. The one or more sensors 120 include video systems 121 such as cameras, thermal cameras, radar systems 122, magnetometers 123, acoustic sensors 124, and any other devices or systems 125 which are capable of detecting a presence of objects within a traffic intersection environment.

The input data 110 is applied to a plurality of data processing component 140 within a computing environment 130 that also includes one or more processors 132, a plurality of software and hardware components, and one or more modular software and hardware packages configured to perform specific processing functions. The one or more processors 132, plurality of software and hardware components, and one or more modular software and hardware packages are configured to execute program instructions to perform algorithms for various functions within the pedestrian tracking and counting framework 100 that are described in detail herein, and embodied in the one or more data processing modules 140.

The plurality of data processing components 140 include a data ingest component 141 configured to ingest, receive, request, or otherwise obtain input data 110 as noted above, and a pedestrian zone detection and counting initialization component 142 configure to initialize the pedestrian tracking and counting framework 100 and retrieval of input data 110 for performing the various functions of the present invention. The plurality of data processing modules 140 also include a pedestrian zone identification component 143, an image processing and pedestrian detection learning component 144, a speed calibration component 145, an incident detection component 146, and a counting component 147.

At least some of these data processing components 140 are configured to generate output data 180 that may take many different forms. Output data 180 may include of a pedestrian count, generated by the counting component 147 according to one or more embodiments of the present invention. Output data 180 may also include a calibrated pedestrian speed, generated by the speed calibration component 145 according to another embodiment of the present invention. Output data 180 may further include an alarm indicated an incident detected in a pedestrian area 104, generated by the incident detection component 146 according to still another embodiment of the present invention. Output data 180 may also be provided for additional analytics and processing in one or more third party or external applications 190. These may include a traffic management tool 191, a zone and lane analysis component 192, a traffic management system 193, and a signal controller 194.

The pedestrian zone identification component 143 is configured to define a pedestrian detection zone 104 in the field of view 112 of the traffic detection zone 114 for subsequent counting of pedestrians 102 therein. Differential analytical approaches 160 may be applied to achieve this determination. In one embodiment, the pedestrian zone identification component 143 applies a zone position analysis 161 that determines the pedestrian detection zone 104 based on locations of one or more of vehicle and bicycle detection zones 105 in the field of view 112.

Vehicle and bicycle detection zones 105 are typically drawn in various places in the field of view 112 depending on user requirements. In most situations, the user requires detection at or near the stop bar. Detection zones 105 are usually drawn above the stop bar, and an algorithm is applied to identify the detection zones 105 nearest to the stop bar. An area comprised of a pedestrian strip is created up to the top line of these zones 105, extending from the left to right edge of the field of view 112 below the top lines of the zones 105. The pedestrian strip height is determined by a calculation of the vehicle and bicycle zone heights, and may be extended to cover a larger area that is more likely to be used by all pedestrians 102.

The zone position analysis 161 therefore accomplishes defining a pedestrian detection zone 104 by identifying a position of at least one vehicle detection zone 105 and at least one bicycle detection zone 105 in nearest proximity to a stop bar, with each of the at least one vehicle detection zone 105 and the at least one bicycle detection zone 105 have a height that extends to or near to the stop bar. Next, the zone position analysis 161 calculates a height of a pedestrian strip in the field of view 112 from the height of the at least one vehicle detection zone 105 and the height of the at least one bicycle detection zone 105, and extends a length of the pedestrian strip to a leftmost edge of the field of view 112, and a rightmost edge of the field of view 112. As noted above, the zone position analysis 161 may also extend the height of the pedestrian strip into a portion of the at least one vehicle detection zone 105 and into a portion of the at least one bicycle detection zone 105.

In another embodiment, the pedestrian zone identification component 143 applies an object movement analysis 162 that determines the pedestrian detection zone 104 based on movement of various objects within the field of view 112, such as vehicles, bicycles, and other pedestrians 102. This analysis 162 does not rely upon any other data, such as the locations of vehicle and bicycle detection zones 105 in the field of view 112, or user drawing of such zones 105.

The object movement analysis 162 determines the area of the field of view 112 where pedestrians 102 typically enter the roadway, by identifying and differentiating pedestrians 102 from other roadway users and tracking their position as the move through the field of view 112. Pedestrians 102 have characteristics that differ markedly from other roadway objects, such as vehicles and bicycles. These characteristics include, but are not limited to, size, gesture, speed, and entry and points in the field of view 112. Standard intersection roadway markings and lane structures 109 may also be used to identify areas where pedestrians 102 should be traveling.

Once the pedestrian zone identification component 143 identifies normal pedestrian tracks 108 in the field of view 112, a boundary box is created and the area can then be used to collect additional data from various analytics, such as determining count, speed, trajectory, and grouping of pedestrians 102. Additionally, by analyzing the motion strength and frequency of activity of each pixel, the pedestrian zone identification component 143 obtains accumulated tracks 106 of moving objects 107 in the field of view 112. This enables refining the boundary of pedestrian detection zone 104, as well as other detection zones 105.

The object movement analysis 162 therefore accomplishes defining a pedestrian detection zone 104 by ascertaining a region of interest 103 in the field of view 112 for pedestrian tracks 108, based on at least one of lane structures and intersection road markings 109 and movement of pixels representing moving objects 107 relative to those lane structures and intersection road markings 109. Accumulated tracks 106 of moving objects 107 are determined in the field of view 112 by analyzing motion strength and frequency of activity of each pixel representing the moving objects 107 in the field of view 112. The present invention also tracks pedestrian characteristics in the region of interest 103 to distinguish the accumulated tracks 106 of the moving objects 107 from the pedestrian tracks 108. Analyzing motion strength of pixels in the object movement analysis 162 may include computing a binary thresholded image defining a histogram of oriented gradient features that further define a pedestrian contour, and updating the histogram as pixel activity occurs in the changing image. Analyzing a frequency of pixel activity may include computing an activity frequency threshold and finding accumulated tracks 106 from pixel frequency activity.

The image processing and pedestrian detection learning component 144 is configured to detect one or more pedestrians 102 in the pedestrian zone 104 from similarities of a single walking pedestrian model with part-based object recognition of individual pedestrians 102, and increment a count for the counting module 147. Multiple analytical approaches 170 may therefore be applied to detect the one or more pedestrians 102 for the counting module 147. In one embodiment, the image processing and pedestrian detection learning component 144 applies a part-based object recognition analysis 171 and image analysis using a histogram of oriented gradient features 172 to develop a model 173 of the single walking pedestrian.

The image processing and pedestrian detection learning component 144 applies these analytical approaches 170 by, in one aspect of the present invention, analyzing portions of the field of view 112 by moving a sliding window through the pedestrian detection zone 104 in the field of view 112, and computing features of current pixel content identified in the sliding window by identifying part-based features that define an individual pedestrian 102. The part-based features include one or more of body structure combinations, body shape, body width and walking gestures. In this part-based object recognition analysis 171, the image processing and pedestrian detection learning component 144 also determines a width and a height of one or more object parts, compares body structure combinations with one or more predetermined templates, and applies one or more geometric constraints to separate the part-based features.

The image processing and pedestrian detection learning component 144 then proceeds with developing the model 173 of a single walking pedestrian to separate each individual pedestrian in a group of moving pedestrians in the field of view 112. This is accomplished by computing a histogram of oriented gradient pedestrian features 172 based on pixels defining a pedestrian contour. The image processing and pedestrian detection learning component 144 next determines a matching confidence between an individual pedestrian and a group of moving pedestrians by calculating a mathematical similarity between the computed features of current pixel content and the model of the single walking pedestrian 173. Where a matching confidence is high, this indicates that an individual pedestrian has been identified, and the present invention increments a pedestrian count in the counting component 147. Where a matching confidence is low, the present invention analyzes the next portion of the field of view 112 by moving the sliding window to the next position in the field of view 112 for further image processing.

Figure 2:
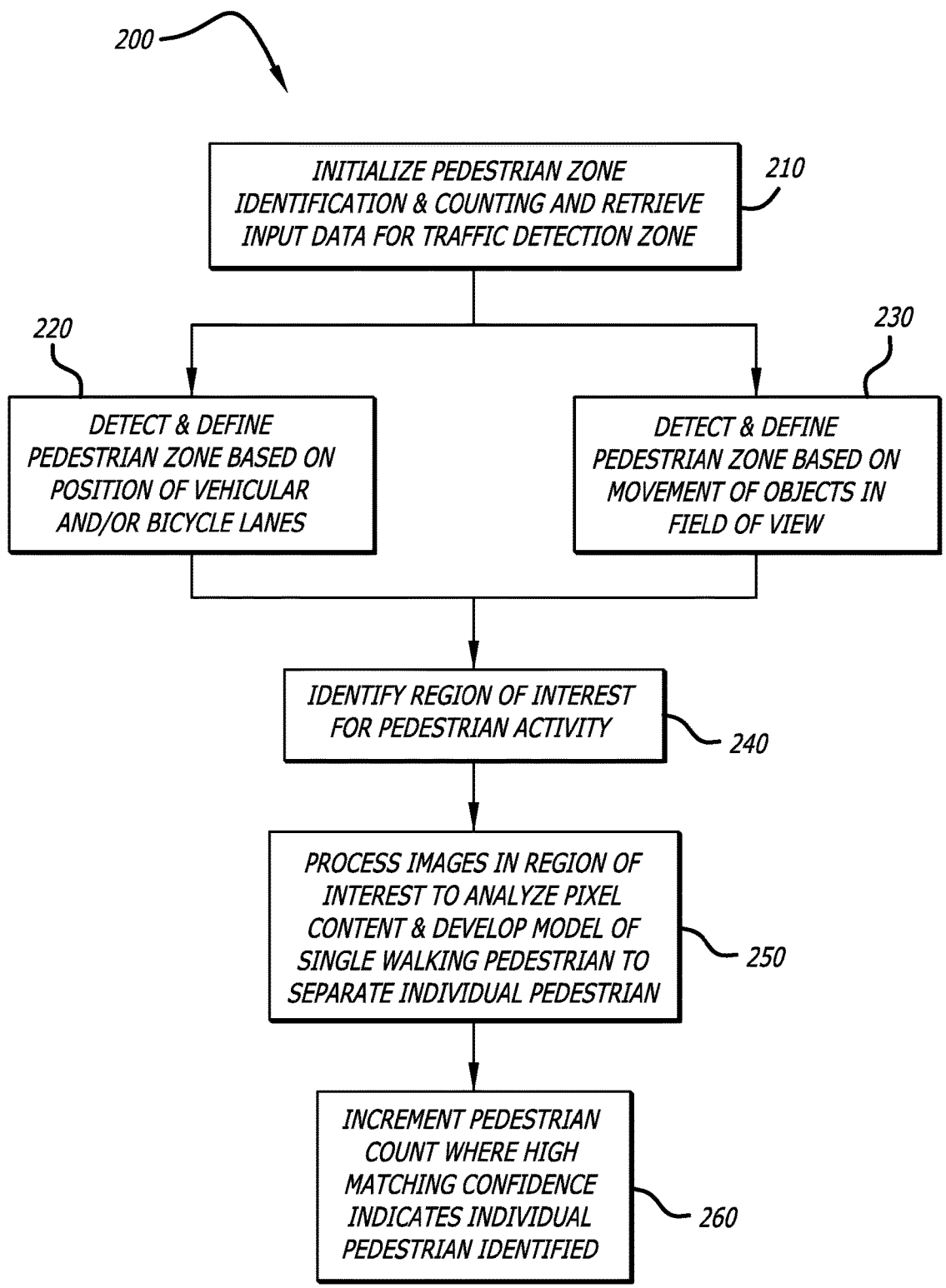
FIG. 2 is a flowchart of steps performed for pedestrian zone detection, identification and counting according to one aspect of the present invention.

FIG. 2 is a flowchart illustrating steps in a process 200 for performing the pedestrian tracking and counting framework 100, according to certain embodiments of the present invention. Such a process 200 may include one or more algorithms for pedestrian zone identification within the component 143, and for image processing and pedestrian detection learning within the component 144, and for the various analytical approaches applied within each such component.

Pedestrian zone identification and counting in the process 200 are initialized at step 210 by retrieving input data 110 representing a field of view 112 for a traffic detection zone 114. The process 200 then detects and defines the pedestrian zone 104, using one of the analytical approaches 160, in either step 220 or 230.

At step 220, the process 200 determines and defines a pedestrian zone 104 using existing positions of one or more of vehicle and bicycle lanes 105 in the traffic detection zone 114. Those, as noted above, may be either manually drawn by users, or automatically determined, and the process at step 220 proceeds by identifying a position of at least one of the vehicle detection zones and bicycle detection zones 105 in nearest proximity to a stop bar, and calculating a height of a pedestrian strip in the field of view 112 from the height of vehicle detection zone(s) 105 and the height of the bicycle detection zone(s) 105. It should be noted that the process 200 does not require both vehicle detection zones and bicycle zones 105, and therefore the pedestrian zone 104 may be calculated using one or both of these types of zones 105. Additionally, one or more of each zone may be used to determine and define the pedestrian zone 104 according to this embodiment of the present invention.

Alternatively, the process 200 applies the analytical approach 162 to determine and define pedestrian zones 104 at step 230, using movement of one or more objects 107 in the field of view 112. As noted above, this approach 162 ascertains a region of interest 103 in the field of view 112 for pedestrian tracks 108, based lane structures and intersection road markings 109 and movement of pixels representing moving objects 107. Regardless of the approach used in either step 220 or step 230, the process 200 identifies a region of interest 103 in the form of a pedestrian detection zone 104 for further processing of images to detect and count pedestrians 102.

At step 250, pixels in the region of interest 103 are processed to analyze pixel content, using a combination of analytical approaches 170 that examine characteristics of a person to separate groups of people and improve count accuracy. One such analytical approach 170 is a part-based object recognition approach 172 which identifies an individual person from a group by using local features which are not affected by occlusion as compared to global features. A single object, in this case a human pedestrian 102, can be thought of as having many individual parts like a head, arms, torso, legs, and each of those parts can be assigned a standard representative pixel size. Identification of these parts, and the relationship between them, can be used to recognize a person from a group, even if partly occluded.

In this approach, assumptions may be made to identify the parts in an image. For example, the head can be approximated as a circular shaped feature, and the shoulders may be approximate as an arc in the image, such as using for example an edge feature space technique. Depending on the camera location and the focal length, predetermined templates may be used to identify these parts using template matching techniques, such as for example edge intensity template matching. Geometric constraints relative to the relationship between the parts may also be applied. For example, a constraint that the head cannot be next to the torso may be used to remove false matches. Additionally, other techniques such as boosted cascade like classifiers with edgelet features may be applied to learn part detection. It is to be noted that parts can include full body, head, torso, shoulder, legs, head-shoulders and many other combinations of such parts.

Another analytical approach 170 employed at step 250 is to develop a model 173 of a single walking pedestrian using a histogram of oriented gradient features 172. Because pedestrians 102 often travel in groups, this may cause the ability to count pedestrians 102 accurately to degrade. The present invention therefore uses various characteristics of pedestrians such as height, width, body shape, head shape, speed and location to separate each individual that may be in a group.

Over time, the process 200 creates a complex model 173 for the single walking pedestrian, based on all the 'single walking pedestrians' that have been identified. The model 173 therefore continually evolves as more data is collected within the present invention.

The single walking pedestrian model 173 is comprised of a histogram of oriented gradient features (HoG) 172 that include head-torso-leg body structure, body shape, body width, walking gestures, and others to define a pedestrian contour. The process 200 computes this by analyzing portions of the field of view 112 in a sliding window that moves through grouped pedestrians in the image 111 to separate individual pedestrians from the grouped pedestrians based on the matching confidence between the single walking pedestrian model 173 and the computed features of the current content in the portions of the field of view 112 in the sliding window. The matching confidence is the mathematical interpretation of the similarity between the single walking pedestrian model 173 and the computed features of the current content of the sliding window. If the matching confidence is high, the process 200 concludes that a single walking pedestrian is found. If it is low, the analysis proceeds to the next portion of the field of view 112 by moving the sliding window to the next position and performs the comparison again, until it reaches the end of the grouped pedestrians.

In a further embodiment, pedestrian detection using a HoG approach 172 and a single walking pedestrian model 173 in step 250 therefore takes an image 111 from input data 110, and may create a multi-scale image pyramid as the process 200 slides a moving window through the image to compute HoG features. The process 200 may also apply one or more statistical classifiers, such as for example SVM or the like, to detect a pedestrian using these HoG features. The process 200 learns by fusing results of these statistical classifiers across all portions of the field of view 112 in sliding window positions and different image scales, and develops the model 173 to detect pedestrians 102.

Returning to FIG. 1, the pedestrian speed calibration component 145 is configured to calibrate a pedestrian speed with a region of interest 103 in the field of view 112 for more accurate detection and counting of pedestrians 102 in traffic intersection control. It is to be noted that pedestrian speed calibration may be performed manually by a user or automatically using one or more image processing steps as discussed below.

The pedestrian speed calibration component 145 performs automatic calibration of pedestrian speed with a region of interest 103 in the field of view 112 through a transformation of image pixels to actual distance traveled of a pedestrian 102 in the image. Because of the constant possibility of movement of sensors 120 such as cameras, and other changes such as focal length in the case of video cameras, the pedestrian speed calibration component 145 attempts a transformation from a pixel-based image 111 to an actual distance-based environment so that a proper speed is calculated in relation to a defined pedestrian zone 104.

The pedestrian speed calibration component 145 uses the intersection pavement markings and lane structures 109 to determine the speed at which a pedestrian 102 is moving in the field of view 112. Based on the position of vehicle and bicycle detection zones 105 in the field of view 112, the present invention detects the horizontal stop bar and lane lines to locate the stop bar location. A stop bar finding algorithm may also be applied to identify one or more horizontally straight white lines in an image, by finding a peak in the horizontal projection. The layout of the traffic detection zone 114 may also be used to find the stop bar, as the bottom zones of each lane are typically close to the stop bar. Once the stop bar is found, the present invention attempts to find lane lines which intersect with the stop bar. Zone coordinates are also utilized to find most vertically-oriented lane lines, either to the left or to the right of a vehicle detection zone 105.

The pedestrian speed calibration component 145 therefore performs automatic calibration of pedestrian speed with a region of interest 103 in the field of view 112 by initially identifying a location of one or more of a stop bar and lane lines in the field of view 112, and determining an intersection of the lane lines with the stop bar to develop coordinates of the region of interest 103. The pedestrian speed calibration component 145 also identifies a vertical orientation of the lane lines relative to the stop bar.

The pedestrian speed calibration component 145 then computes features of an image 111 inside the region of interest 103 to differentiate between image pixels. Features analyzed may include edge gradients, thresholded grayscale pixels, and feature projections. The present invention then measures an inter-lane distance between the image pixels using a known lane line width and the vertical orientation of the lane lines relative to the stop bar to map the image pixels to an actual distance traveled of a pedestrian 102 in the region of interest 103. Using this measurement and mapping, the pedestrian speed calibration component 145 calculates a pedestrian speed from the actual distance traveled that is calibrated with the region of interest 103. The calculation includes computing the number of feet or meters traveled relative to lane lines and stop bar markings, and the distance per unit of time traveled by the pedestrian 102. The calibrated pedestrian speed may then be provided to a traffic controller system as output data 180, or other external devices or location for storage or use.

Figure 3:
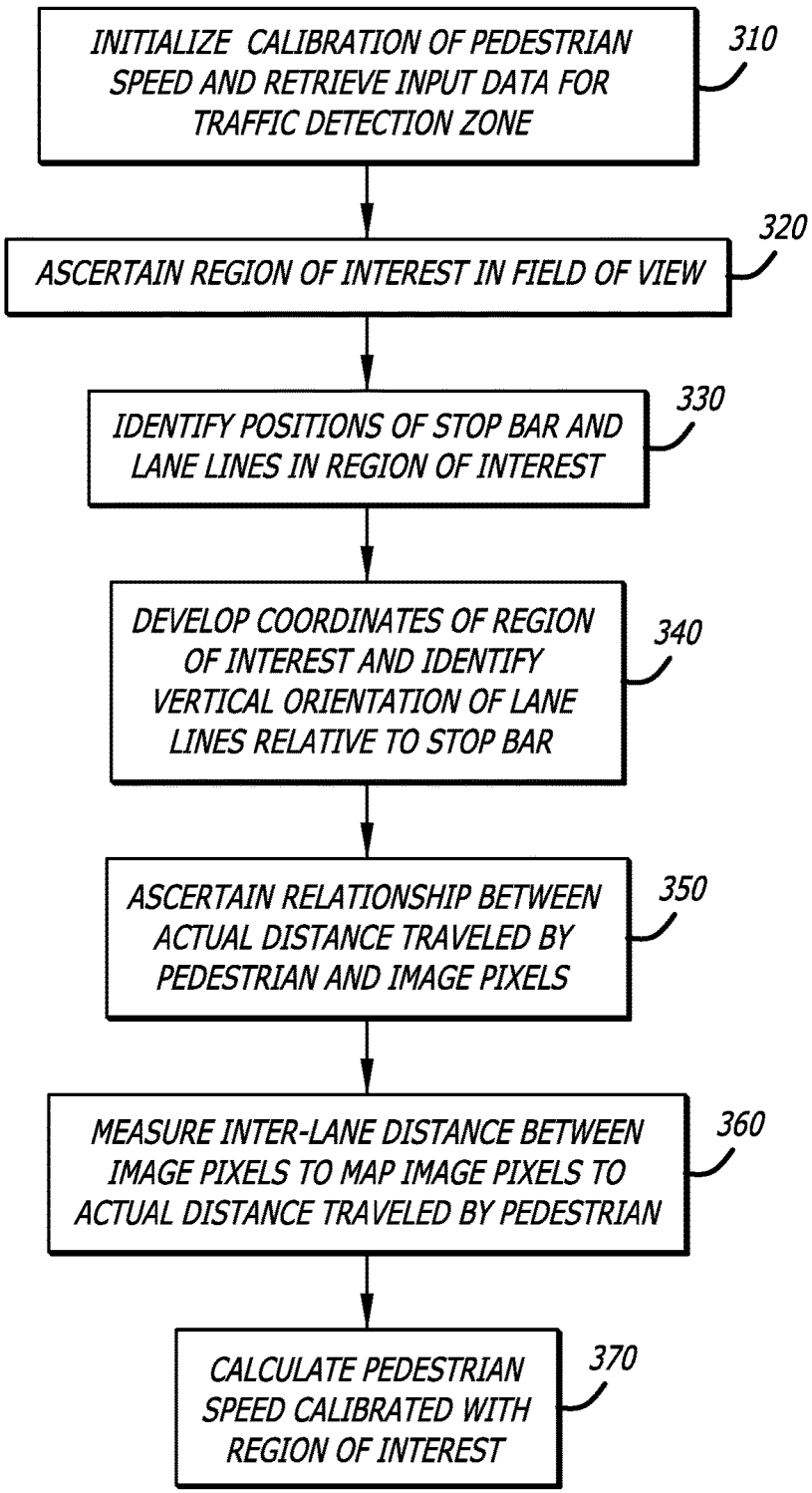
FIG. 3 is a flowchart of steps performed for calibrating a pedestrian speed in pedestrian zone detection, identification and counting according to another aspect of the present invention.

FIG. 3 is a flowchart illustrating steps in a process 300 for performing the calibration of pedestrian speed in the pedestrian tracking and counting framework 100, according to another embodiment of the present invention. Such a process 300 may include one or more algorithms for pedestrian speed calibration in a region of interest 103 within the component 145.

The process 300 is initialized at step 310 by retrieving input data 110 representing a field of view 112 in the traffic detection zone 114. The process 300 analyzes this input data 110 to ascertain, at step 320, a region of interest 103 in which pedestrians 102 may use the roadway within the traffic detection zone 114. The region of interest 103 may or may not be the specific pedestrian detection zone 104 referenced above with respect to other aspects of the present invention. Regardless, the process 300 determines the region of interest 103 using one or more of pavement or intersection markings and lane structures 109, positions of other detection zones 105, movement of objects 107 in the field of view 112, or some combination of these approaches.

At step 330, the process 300 attempts to identify positions of both a stop bar and lane lines for vehicles and bicycles in the region of interest 103. Using this information, the process 300 develops positional coordinates of the region of interest 103 at step 340. This may be performed in combination with the approach(es) used to ascertain a region of interest 103. Regardless, these zonal coordinates are used to further identify vertical orientations of the lane lines relative to the stop bar, so that those lane lines with the most vertical orientations relative to the detected stop bar are used for further computations of pedestrian speed as noted below.

Once the region of interest 103 has been ascertained, the process 300 then attempts to ascertain a relationship between an actual distance traveled by a pedestrian 102 and image pixels in the input data 110 at step 350. This involves measuring an inter-lane distance between the image pixels at step 360, and mapping image pixels to the actual distance traveled. This is performed using standard lane widths, so that once most vertical orientations of lane lines are established in step 340, the transformation from an image to actual distance traveled by a pedestrian 102 can be accomplished.

The process continues at step 370 by calculating pedestrian speed. This is performed as noted above by computing the distance, in number of feet or meters, traveled relative to lane lines and stop bar markings, and the distance per unit of time traveled by the pedestrian 102. The pedestrian speed is therefore calibrated to the region of interest 103 for appropriate traffic intersection control, and the speed is provided as output data 180 to one or more of a traffic management tool 191, traffic management system 193, intersection signal controller 194, additional analytics 192, or any other additional or external applications 190.

Returning to FIG. 1, the incident detection component 146 is configured to detect various pedestrian incidents and to provide an alarm as output data 180 when a pedestrian incident is determined. Incidents may include non-moving objects within the pedestrian detection zone 104, or within the field of view 112 generally, that can cause abnormal pedestrian and vehicle movements. Incidents may also include prone objects or pedestrians 102 within the pedestrian detection zone 104, for example pedestrians 102 have fallen to the pavement. Other types of incidents include a presence of unauthorized vehicles in the pedestrian detection zone 104.

Once the pedestrian detection zone 104 has been defined to track and identify moving pedestrians 102 as discussed above, the incident detection component 146 learns the background of the pedestrian detection zone 104 to continually search for parts of that area that are different than the background it has learned. If a change in the background has been present for some amount of time, and/or where moving vehicles (or even other walking pedestrians) being tracked are avoiding the area that has changed to avoid contact, the incident detection component 146 concludes that non-moving objects are in the pedestrian detection zone 104 and generates a warning signal. Non-moving objects may include fallen pedestrians, stalled vehicles, objects that have fallen from moving vehicles, motorcyclists or bicyclists who are down, or objects placed in the pedestrian detection zone 104 by someone.

The incident detection component 146 tracks walking pedestrians 102 as they move all the way through the pedestrian detection zone 104, from the entry point through to the exit point. If a pedestrian 102 stops at the middle of the pedestrian detection zone 104 for some time, and does not move forward or backward and continues to be present in the zone 104, then the present invention can issue an alarm signaling "pedestrian down in the roadway" to alert the responsible authorities.

The incident detection component 146 may also track movement of vehicles, bicycles, motorcycles, and other objects 107 in the field of view 112. Where it detects that an object 107 has entered the pedestrian detection zone 104, and stop there and not proceed for some time, the incident detection component 146 may signal that an unauthorized vehicle is present in the pedestrian detection zone 104 to alert authorities for further investigation.

Figure 4:
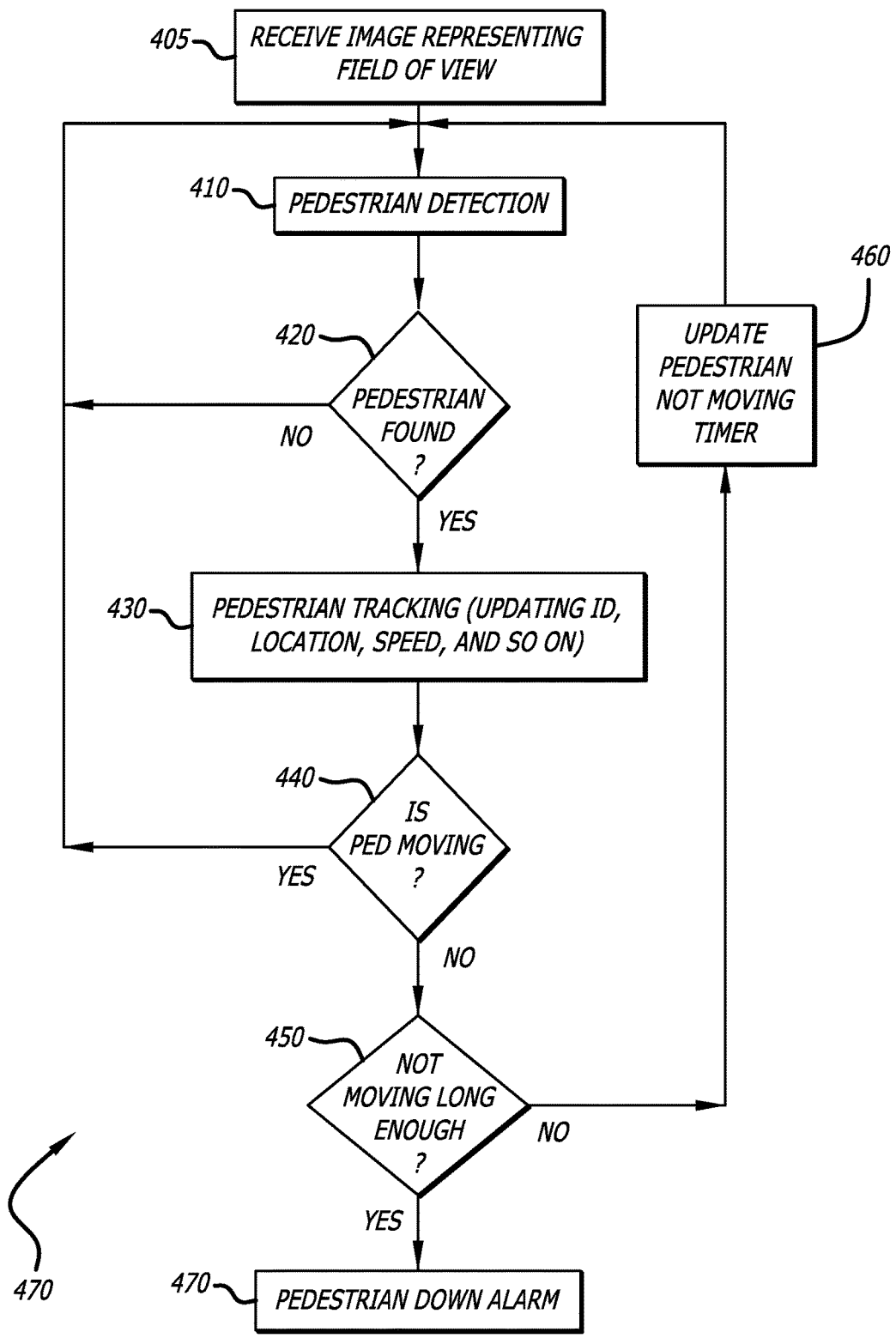
FIG. 4 is a flowchart of steps performed for incident detection in the pedestrian zone detection and pedestrian identification and counting according to one embodiment of the present invention.

FIG. 4 is a flow diagram illustrating steps in a process 400 of incident detection in the pedestrian tracking and counting framework 100 according to one embodiment of the present invention. Such a process 400 may include one or more algorithms for incident detection within the component 146. In this process 400, the present invention receives an image 111 representing the field of view 112 in step 405 and thereby initializes the incident detection component 146. At step 410, the present invention performs pedestrian detection using one or more methods as described herein, and if a pedestrian 102 is identified at step 420, proceeds with tracking the pedestrian 102 at step 430, together with updating the identification, location, speed, and other characteristics. If no pedestrian 102 is identified at step 420, the algorithm loops back to begin processing a new image 111 representing the field of view 112.

The algorithm for incident detection in the component 146 then determines if the pedestrian 102 is moving at step 440. If the pedestrian is found to be in motion, the process 400 returns to begin processing a new image 111 representing the field of view 112. If, however, the pedestrian 102 is not in motion at step 440, the algorithm for incident detection proceeds to determine how long the pedestrian 102 has been stationary at step 450. If the pedestrian 102 is not in motion in excess of a certain amount of time, a pedestrian down alarm is generated at step 470 as output data 180.

The certain amount of time may be preset by a user, and may also be learned by the process 400 as pedestrians 102 and other objects 107 are identified and tracked. A timer may be updated at step 460 for determining whether a pedestrian 102 is not in motion for a certain amount of time, and this value is returned to the beginning of the algorithm. In this matter, were the incident detection components that pedestrians 102 are not in motion for some specific reason (for example, a blockage in traffic) then this value can be stored and used by the process 400.

In one embodiment of the present invention, the pedestrian tracking and counting framework 100 may be configured to provide a separate output 180 to a traffic signal controller 194 when a group of pre-determined people is identified to enable additional functions to be performed. A user may set sample size for this output 180 using the traffic management tool 191, or it may be automatically determined within the present invention.

Regardless, several applications are possible with an identified group as an output 180. For example, the traffic signal controller 194 may extend the walk time or hold a red light for vehicles to allow safe passage through the intersection. In another example, the present invention may use an identified group of people to further identify periods of high pedestrian traffic for better intersection efficiency. It is therefore to be understood that many uses of output data 180 in applications for traffic intersection signal control are possible and within the scope of the present invention.

The pedestrian tracking and counting framework 100 of the present invention may be applied in many different circumstances. For example, the present invention may be used to identify pedestrians 102 during adverse weather conditions when physical danger may increase due to reduced visibility. The present invention may therefore perform pedestrian detection in low-light, fog or other low-contrast conditions for improved roadway and intersection.

In another example, the present invention may be used to identify the difference between a pedestrian 102 and the pedestrian's shadow. In such an example, the pedestrian detection is improved through rejection of pedestrian shadows to ensure improved accuracy in pedestrian detection and counting.

In still a further example, the present invention may be used to determine a normal or average crossing speed for pedestrians 102 in a detection zone 104. This may be then be used to identify slow-moving pedestrians 102, such as the elderly, children, and disabled or wheelchair-bound persons, to extend and/or adjust a signal timing for crossing the intersection for safer passage. It may also be used to identify faster-moving intersection users, such as pedestrians 102 using hover boards, skateboards, or other such devices in the pedestrian detection zone 104.

The present invention may further be used to identify late arrivals in the pedestrian detection zone 104, to extend and/or adjust signal timing for safe intersection passage. The present invention may also receive and use additional input from the traffic signal controller to identify when a pedestrian 102 starts to cross the intersection after a certain percentage of the crossing time has expired. The present invention may also be utilized to compute a crosswalk occupancy, for example to determine a pedestrian density in the detection zone 104.

As noted above, the pedestrian tracking and counting framework 100, and the various processes described herein, may be utilized in combination with existing approaches to determining vehicle and bicycle detection zones 105, and may be therefore performed using the existing field of view 112 in a traffic detection zone 114 that is designed to detect vehicles, bicycles and other road users needing the traffic signal to cross an intersection.

In one embodiment, in order to achieve better accuracy, the present invention may use an existing vehicle detection status, such as speed or saturation, to dynamically change the sensitivity of pedestrian detection. For example, a known vehicular status may be applied to increase the likelihood of pedestrian crossing when stopped vehicle is detected, or when no vehicle in present. Conversely, it may be used to decrease the likelihood of pedestrian crossing while vehicular traffic is freely flowing. Therefore, the present invention use knowledge of either stopped or moving vehicles or bicycles in the respective other detection zones 105 or moving vehicles to improve pedestrian detection accuracy.

Similarly, the present invention may be part of a whole scene analysis that combines vehicular, bicycle, and pedestrian detection to identify different moving objects 107, such as vehicles, motorcycles, bicycles and pedestrians. Each object type has its own unique characteristics, and the present invention is configured to automatically learn these unique characteristics and apply them to identify the different types. Output data 180 from such a whole scene analysis provides traffic engineers, responsible authorities, and the public with a complete picture of street and intersection activity (for example, who is using what and at what time and for how long) for improved roadway management.

As noted above, the pedestrian tracking and counting framework 100 may be configured to learn features of a traffic intersection, such as the background, using the image processing paradigms discussed herein. This may further include one or more approaches for learning roadway lane structures for improving accuracy of in identifying vehicles, bicycles, pedestrians, and other objects 107 in a traffic detection zone 114.

Consider a scenario where a lane line is detected to the left side of a field of view 112, and its feature signature was learned over time to account for how much natural variability can be expected. Consider further that this lane line structure gets occluded 80% of the time a vehicle is detected inside the traffic detection zone 114. It can be inferred that when the lane line gets occluded then it is possible that a vehicle is likely present inside the traffic detection zone 114, thereby increasing a detection rate. Also, consider the case where a curb was detected to the right side of a zone and it was learned that the curb gets occluded 90% of the time when a vehicle is present inside the traffic detection zone 114. This can be used to reduce a nuisance or false call rate, which can be caused by shadows or portions of vehicles present in the neighboring zone that can confuse the existing image analysis algorithms to misconstrue the contents of a zone. Where detection and false call rates are key metrics used to measure accuracy, having low missed and false calls improves the overall performance and efficiency of a traffic management system.

The present invention may include an approach that incorporates a highly robust model that learns roadway structures to improve sensing accuracy of a traffic management system. Such a roadway structure model provides a high confidence that learned structures correspond to physical roadway structures, and is robust to short-term changes lighting conditions, such as shadows cast by trees, buildings, clouds, vehicles, rain, fog, etc. The model also adaptively learns long-term appearance changes of the roadway structures caused by natural wear and tear, seasonal changes in lighting (winter vs. summer), etc. The model also exhibits a low decision time (in milliseconds) for responding to occlusions caused by fast moving traffic, and low computational complexity capable of running on an embedded computing platform.

In one exemplary embodiment, the present invention looks at user-drawn zones 105 to initialize and establish borders for regions of interest 103 for various detection zones. Images 111 are processed to compute features inside borders for the region of interest 103, and find roadway structures using these computed features. The model is then developed to learn background structures from these features to detect an occlusion, and learn the relationship between structure occlusions and detection zones 105.

Several roadway characteristics may aid in the model's ability to learn the background and relationship between structure occlusions and detection ones. For example, roadway structures such as lane lines, curbs, and medians are generally found adjoining detection zone boundaries. Also, roadway structures exhibit strong feature patterns that can be generalized. For example, they contain strong edges and are relatively bright in grayscale. Such structures can be effectively described by overlapping projector peaks of positive edges, negative edges and thresholded grayscale pixels. These structures are also persistent, and their feature signatures can be learned over time to detect occlusions and draw inferences regarding the presence of vehicles in the neighboring zones.

In the modeling approach described above, every zone requires the computation of a left and a right border region of interest 103. If two zones are considered horizontal neighbors, then they will share a border region of interest 103, and the area between the zones is established as the border region of interest 103. If a zone has no neighboring zones to the left or right, then the corresponding the boundary of the corresponding side is extended by an area proportionate to the zone width, and this extended area serves as the border region of interest 103 for the zone. Also, each border region of interest 103 may be sub-divided into tile regions of interest based on the size of the user-drawn zones. A larger zone provides a larger border area, allowing the model to work with smaller tiles that provide a more localized knowledge of structures and occlusion.

Features are computed in the border region of interest 103 by computing edges from projecting positive and negative edges across rows, and finding peak segments from each projected positive and negative edge. Additionally, the peak segments may be determined by computing a gray histogram and a cumulative histogram from image pixels, determining a gray threshold image, and projecting resulting pixels across rows. Roadway structures are learned from each computed feature by finding overlapping feature segment locations, accumulating peak segment locations of overlapping features in a histogram, and finding peaks in the feature background histograms. The model of roadway structures is therefore established using feature histogram peak locations. This is used to identify an occlusion by finding overlapping positive edge peak segments, negative edge peak segments, and gray threshold peak segments with the background histogram. Matching scores are compute for each of these overlaps and compared to threshold values to differentiate between a visible structure and an occlusion.

The systems and methods of the present invention may be implemented in many different computing environments.

For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
    receiving input data representing a field of view of a traffic detection zone;
    analyzing the input data within a computing environment in one or more data processing modules executed in conjunction with at least one specifically-configured processor, the one or more data processing modules configured to automatically calibrate a pedestrian speed in the field of view for traffic intersection control, by:
        identifying a location of a stop bar and lane lines in a region of interest in the field of view,
        determining an intersection of the lane lines with the stop bar to develop coordinates of the region of interest in the field of view and identify a vertical orientation of the lane lines relative to the stop bar,
        computing features of an image inside the region of interest that include one or more of edge gradients, thresholded grayscale pixels, and feature projections to differentiate between image pixels,
        measuring an inter-lane distance between the image pixels using a lane line width and the vertical orientation of the lane lines relative to the stop bar to map the image pixels to an actual distance traveled of a pedestrian in the region of interest, and
        calculating a pedestrian speed from the actual distance traveled that is calibrated with the region of interest; and
    generating, as output data, the pedestrian speed.

2. The method of claim 1, wherein the input data is captured by one or more sensors in or near a traffic intersection, the one or more sensors including at least one of video cameras, a radar system, and a magnetometer.

3. The method of claim 1, further comprising providing the output data to a traffic management tool.

4. The method of claim 3, wherein the lane line width is a specified distance between lane structure markings that define one or more of a vehicular lane and a bicycle lane in a traffic detection zone.

5. The method of claim 4, wherein the lane line width is configurable using the traffic management tool.

6. The method of claim 1, wherein the identifying a location of a stop bar and lane lines includes identifying a location of at least one of a vehicle detection zone and a bicycle detection zone in the field of view.

7. The method of claim 1, wherein the determining an intersection of the lane lines with the stop bar further comprises identifying one or more of the lane lines with the most vertical orientation relative to the stop bar.

8. The method of claim 1, wherein the calculating a pedestrian speed further comprises calculating a distance traveled relative to both the lane lines and the stop bar, and calculating a distance per unit of time.

9. The method of claim 1, wherein the identifying a location of a stop bar and lane lines in a region of interest in the field of view, and the determining an intersection of the lane lines with the stop bar, are continually performed to establish the region of interest as input data is received.

10. A system, comprising:
a computing environment including at least one non-transitory computer-readable storage medium having program instructions stored therein and a computer processor operable to execute the program instructions within one or more hardware and software components configured to perform data processing functions to automatically calibrate a pedestrian speed for traffic intersection control, the one or more hardware and software components including:
a pedestrian zone detection component configured to continually establish a region of interest in a field of view of a traffic detection zone, by identifying a location of a stop bar and lane lines in a region of interest in the field of view, and determining an intersection of the lane lines with the stop bar to develop coordinates of the region of interest and identify a vertical orientation of the lane lines relative to the stop bar;
an image processing component configured to analyze image pixels in the region of interest, by computing features of an image inside the region of interest that include one or more of edge gradients, thresholded grayscale pixels, and feature projections to differentiate between the image pixels, measuring an inter-lane distance between the image pixels using a lane line width and the vertical orientation of the lane lines relative to the stop bar to map the image pixels to an actual distance traveled of a pedestrian in the region of interest, and calculating a pedestrian speed from the actual distance traveled that is calibrated with the region of interest; and
an output data component configured to communicate the calibrated pedestrian speed to an external device or location.

11. The system of claim 10, wherein the field of view is captured by one or more sensors in or near a traffic intersection, the one or more sensors including at least one of video cameras, a radar system, and a magnetometer.

12. The system of claim 10, further comprising providing the calibrated pedestrian speed to a traffic management tool.

13. The system of claim 12, wherein the lane line width is a specified distance between lane structure markings that define one or more of a vehicular lane and a bicycle lane in a traffic detection zone.

14. The system of claim 13, wherein the lane line width is configurable using the traffic management tool.

15. The system of claim 10, wherein the identifying a location of a stop bar and lane lines includes identifying a location of at least one of a vehicle detection zone and a bicycle detection zone in the field of view.

16. The system of claim 10, wherein the determining an intersection of the lane lines with the stop bar further comprises identifying one or more of the lane lines with the most vertical orientation relative to the stop bar.

17. The system of claim 10, wherein the calculating a pedestrian speed further comprises calculating a distance traveled relative to both the lane lines and the stop bar, and calculating a distance per unit of time.

18. The system of claim 10, wherein the identifying a location of a stop bar and lane lines in a region of interest in the field of view, and the determining an intersection of the lane lines with the stop bar, are continually performed to establish the region of interest as input data representing the field of view is received.

19. A method of automatically calibrating pedestrian speed in a field of view for traffic intersection control, comprising:
ascertaining a region of interest in a field of view of a traffic detection zone to define a pedestrian zone, by identifying a location of a stop bar and lane lines in the field of view, and determining an intersection of the lane lines with the stop bar to develop coordinates of the region of interest, identify a vertical orientation of the lane lines relative to the stop bar, and identify one or more of the lane lines with the most vertical orientation relative to the stop bar;
ascertaining a relationship between an actual distance traveled by a pedestrian and image pixels representing one or more pedestrians in the region of interest to determine a pedestrian speed, by computing features of an image inside the region of interest that include one or more of edge gradients, thresholded grayscale pixels, and feature projections to differentiate between the image pixels, and measuring an inter-lane distance between the image pixels using a lane line width and the vertical orientation of the lane lines relative to the stop bar to map the image pixels to the actual distance traveled by the pedestrian in the region of interest; and
calculating a pedestrian speed from the relationship between the actual distance traveled by the pedestrian and the image pixels that is calibrated with the region of interest, by computing a distance traveled relative to both the lane lines and the stop bar, and computing a distance per unit of time.

20. The method of claim 19, wherein the field of view of the traffic detection zone is captured by one or more sensors in or near a traffic intersection, the one or more sensors including at least one of video cameras, a radar system, and a magnetometer.

21. The method of claim 19, further comprising providing the pedestrian speed that is calibrated to the region of interest to a traffic management tool.

22. The method of claim 21, wherein the lane line width is a specified distance between lane structure markings that define one or more of a vehicular lane and a bicycle lane in a traffic detection zone.

23. The method of claim 22, wherein the lane line width is configurable using the traffic management tool.

24. The method of claim 19, wherein the identifying a location of a stop bar and lane lines includes identifying a location of at least one of a vehicle detection zone and a bicycle detection zone in the field of view.

* * * * *